United States Patent

Ambrose et al.

[11] 4,075,186
[45] Feb. 21, 1978

[54] GRAFT COPOLYMERS OF POLYBUTADIENE AND SUBSTITUTED POLYACRYLATE

[75] Inventors: Richard J. Ambrose, Akron; Robert A. Hayes, Cuyahoga Falls, both of Ohio

[73] Assignee: The Firestone Tire & Rubber Company, Akron, Ohio

[21] Appl. No.: 651,094

[22] Filed: Jan. 21, 1976

Related U.S. Application Data

[63] Continuation-in-part of Ser. No. 518,655, Oct. 29, 1974, abandoned.

[51] Int. Cl.$^2$ .............................................. C08L 9/00
[52] U.S. Cl. ............................................................ 260/887
[58] Field of Search ............................................ 260/887

[56] References Cited

U.S. PATENT DOCUMENTS

| | | | |
|---|---|---|---|
| 3,235,626 | 2/1966 | Waack | 260/884 |
| 3,636,141 | 1/1972 | O'Neill et al. | 260/887 |
| 3,786,009 | 1/1974 | Lohr, Jr. et al. | 260/79.5 R |
| 3,786,116 | 1/1974 | Milkovich et al. | 260/879 |
| 3,803,265 | 4/1974 | Griffith et al. | 260/879 |

Primary Examiner—J. Ziegler

[57] ABSTRACT

A graft copolymer composition comprises a butadiene polymer grafted onto or pendent from a backbone consisting solely of a substituted polyacrylate. The substituted acrylate polymer is prepared from monomers having the formula:

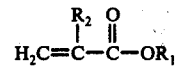

where $R_1$ is a hydrocarbon radical of 1 through 30 carbon atoms selected from the group consisting of alkyl, cycloalkyl, aryl and aralkyl and where $R_2$ is a hydrocarbon radical containing from 1 through 12 carbon atoms selected from the group consisting of alkyl, cycloalkyl, aryl, and aralkyl.

14 Claims, No Drawings

GRAFT COPOLYMERS OF POLYBUTADIENE AND SUBSTITUTED POLYACRYLATE

CROSS-REFERENCE

This application is a continuation-in-part of U.S. Ser. No. 518,655, filed Oct. 29, 1974 entitled "Graft Copolymers of Vinyl Polybutadiene and Substituted Polyacrylates", now abandoned.

BACKGROUND OF THE INVENTION

The present invention relates to a true graft copolymer composition containing low or high vinyl butadiene grafted onto substituted polyacrylates and a method for making the same. More specifically, the present invention relates to free flowing molding or powdered compositions containing high vinyl polybutadiene grafted onto the backbone of a substituted polyacrylate through anionic polymerization.

Heretofore, high vinyl polybutadiene thermosetting resins although having outstanding electrical properties nevertheless possessed several shortcomings such as poor impact resistance and poor coldflow properties. A previous approach to eliminate these disadvantages involved the preparation of copolymers containing styrene but was unsuccessful since the benzylic hydrogens in the styrene segments retard the cure of the resin in much the same manner as allylic hydrogens in 1,4-butadiene retard cure.

Moreover, prior anionic polymerization of substituted acrylates such as methyl methacrylate were generally difficult and unpractical due to problems with side reactions and hence polymerization has been according to the free radical route.

Waack, U.S. Pat. No. 3,235,626 granted Feb. 15, 1966 relates only to copolymers prepared through free radical polymerization.

Griffith et al., U.S. Pat. No. 3,803,265 granted Apr. 9, 1974 relates to a free radical reaction wherein butadiene is incorporated into a methyl methacrylate chain and thus forms a copolymer.

Milkovich et al., U.S. Pat. No. 3,786,116, granted Jan. 15, 1974, relates to a copolymer backbone having a third polymer grafted thereto. Should a free radical mechanism be utilized, a gel will form due to the existance of free double bonds which permit cross-linking between polymers or chains. If anionic polymerization is utilized, a highly branched polymer is formed. A cationic reaction does not take place if butadiene is utilized. Additionally, the graft copolymer of Milkovich is not attached to the backbone through a carbonyl or ketone group.

O'Neill, U.S. Pat. No. 3,636,141, granted Jan. 18, 1972, basically relates to prevention of shrinkage of high vinyl polybutadiene compounds. Methyl methacrylate polymers as well as polymers produced from vinyl monomers are utilized merely as fillers. Should polybutadiene be utilized, the free radical mechanism of O'Neill will result in cross-linking.

SUMMARY OF THE INVENTION

It is therefore, an object of the present invention to produce compositions containing polybutadiene grafted onto a substituted polyacrylate backbone.

It is another object of the present invention to provide compositions, as above, which may be prepared by an anionic grafting technique and contain a high vinyl polybutadiene polymer.

It is a further object of the present invention to produce a composition, as above, which is tack free or free flowing and has high impact resistance.

It is an additional object of the present invention to provide compositions, as above, which have high heat resistance and good electrical resistant properties.

These and other objects of the present invention are described in detail without attempting to discuss all of the various modifications in which the invention might be embodied; the invention being measured by the appended claims and not by the details of the specification.

In general, a graft copolymer composition comprises polybutadiene grafted onto a substituted polyacrylate backbone to form the graft copolymer, said graft copolymer containing from 25 to 75 percent by weight of said substituted polyacrylate, said substituted polyacrylate backbone containing solely and produced from monomers having the formula:

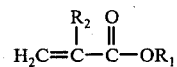

wherein $R_1$ is a hydrocarbon group having from 1 to 30 carbon atoms selected from the group consisting of alkyl, cycloalkyl, aryl and aralkyl and wherein $R_2$ is a hydrocarbon group having from 1 through 12 carbon atoms selected from the group consisting of alkyl, cycloalkyl, aryl and aralkyl, said graft copolymer containing said polybutadiene substituted for said $-OR_1$ groups of said substituted polyacrylate.

DESCRIPTION OF THE PREFERRED EMBODIMENTS

According to the concepts of the present invention, a true graft copolymer is produced containing a butadiene polymer grafted onto, that is, pendent from a substituted acrylate polymer. Production of the graft copolymer is achieved utilizing anionic polymerization.

The butadiene may have a low vinyl content but desirably is high vinyl in that at least 50 percent and generally 80 percent with desirably 90 percent of the butadiene repeating units in the polymer being in the 1,2-configuration. The polybutadiene may be produced by polymerizing monomers by means of anionic catalysts to a relatively low molecular weight of about 1,000 to about 200,000. Desirably the average molecular weight as determined by intrinsic viscosity measurement is at least 12,500 and the molecular weight distribution such that at least 50 percent and preferably 90 percent of the polymers have a molecular weight above 10,000 and at least 95 percent have a molecular weight about 2,000. Generally, the presence of higher proportions of lower molecular weight polymers than allowed by these limitations cause slow curing rates and poor physical properties in the cured product. Good processability and good flow during molding is usually obtained if the average molecular weight is no greater than 55,000 which corresponds to the intrinsic viscosity in toluene of about 0.7 at 25° C or about 0.68 at 30° C. The above molecular weights are number average molecular weights.

The butadiene polymers are prepared by anionically polymerizing the monomers with conventional anionic catalysts in a manner which is well known to those skilled in the art. Organo alkali metal initiators which can be either mono or polyfunctional are generally preferred. Although sodium, potassium, rubidium and cesium are suitable, lithium is the preferred alkali metal. The hydrocarbon catalyst radical is selected from the group consisting of aliphatic, cycloaliphatic and aromatic radicals containing from 1 to 30 carbon atoms per molecule. Specific examples of lithium initiators include methyllithium, n-butyllithium, n-amyllithium and the like. The compound n-butyllithium is a very highly preferred initiator. The essential feature of these initiators is that they possess a carbon lithium bond which acts on the point of initiation for the polymerization. Of the resulting polymers produced, substantially all have a lithium or alkali metal atom positioned at one end. A specific desirable average molecular weight, of course, may be readily produced by utilizing a calculated amount of initiator. As with all anionic polymerization processes, necessary steps must be taken to exclude any side producing reactions such as that caused by active hydrogens, for example acids, alcohols, water and the like. This requirement of the general exclusion of active hydrogens from the process is also applicable to the anionic polymerization of the graft copolymer.

Formation of the high vinyl polymers may be carried out at temperatures less than minus 15° C. The polymerization may utilize solvents which tend to assure a high proportion of vinyl units in the butadiene segments such as hexane, heptane, toluene each modified with TMEDA (tetramethylethylene diamine) and preferably tetrahydrofuran (unmodified). Thus, formation of the low vinyl polymers is generally carried out at about 0° to about 50° C in solvents such as hexane, heptane and toluene.

The substituted polyacrylates utilized in the present invention are made from monomers which can be represented by the formula:

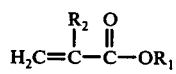

where $R_1$ is a hydrocarbon radical or group having from 1 to 30 carbon atoms selected from the group consisting of alkyl, cycloalkyl, aryl, and aralkyl and where $R_2$ is also a hydrocarbon radical or group having from 1 to 12 carbon atoms selected from the group consisting of alkyl, cycloalkyl, aryl and aralkyl. Desirably, $R_1$ is a hydrocarbon radical having from 1 to 12 carbon atoms such as lauryl or cyclohexyl. It has been found that the length of the $R_1$ hydrocarbon radical tends to make the graft copolymer composition more rubbery due to the effect upon the glass transition temperature. For example, where $R_1$ contains 12 carbon atoms (e.g., lauryl), the approximate glass transition temperature of the composition is minus 100° C whereas where $R_1$ is 1 carbon atom or methyl, the transition temperature is about 100° C. Low glass transition temperatures produce a graft copolymer composition which is undesirable for making a powdery resin since such resin does not tend to be free flowing or tack free at ambient temperatures. Thus, an $R_1$ hydrocarbon group containing from 1 to about 4 carbon atoms is preferred with 1 carbon atom or methyl being highly preferred. The hydrocarbon group of methyl is also highly preferred due to economic considerations.

Similarly, the long chain $R_2$ hydrocarbon group is also generally undesirable since they tend to impart a rubbery and tacky nature to the graft copolymer composition. Thus an $R_2$ hydrocarbon radical containing from 1 to about 3 carbon atoms is preferred such as an ethyl or propyl group. The hydrocarbon group of methyl is highly preferred and thus a substituted polyacrylate highly preferred in the present invention is made from methyl methacrylate monomers.

The substituted polyacrylate may be produced by free radical polymerization according to well known procedures in suitable solvents such as hexane, heptane and preferably toluene to produce a linear homopolymer. However, bulk polymerization techniques are preferably utilized. The amount of catalyst added can vary over a broad range depending upon the desirable molecular weight of the substituted polyacrylate. A wide molecular weight range such as from 10,000 to 300,000 or 400,000 may be utilized in that the graft copolymer composition will generally have improved free flowing or tack free molding properties as well as high impact resistance over high vinyl polybutadienes. However, high molecular weights produce a graft copolymer having a low plasticity value so that processability is not extremely good. A more desirable range extends from about 20,000 to about 100,000 while a preferred range extends from about 30,000 to about 75,000 and a molecular weight of approximately 50,000 gives extremely good processability. These molecular weights are in terms of number average molecular weights.

The low or high vinyl polybutadiene substituted polyacrylate graft copolymers of the present invention are prepared by adding a solution of the previously described vinyl polybutadienes compounds, which are formed using an anionic initiator (e.g., butyl lithium), and thus contains an active anion (e.g., 1,2 polybutadienyl anion) to a solution of the previously described substituted acrylate polymers. The graft copolymer is formed by anionic substitution and rapidly proceeds at ambient temperatures. A small amount of an anionic catalyst such as 0.1 millimoles of n-butyllithium per gram of substituted polyacrylate is generally added to the reaction mixture prior to grafting as a precaution to prevent any unfavorable side reactions. Of course, the anionic substitution is carried out in an environment essentially free of active hydrogens.

The reaction involves a carbonyl addition in which the basic polybutadienyl anions displace the —$OR_1$ groups of the substituted acrylate polymers. In other words, the substituted acrylate polymer which polymerizes through the double bond has the repeating unit

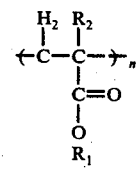

which is attacked by the vinyl polybutadienes at the pendent

(carbonyl) group so that the graft copolymer at the pendent substituted site has the structure:

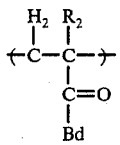

where Bd represents the vinyl polybutadiene compound. Thus, it can be clearly seen that the present invention relates to a true graft copolymerization wherein the polybutadiene is grafted to the backbone consisting entirely and solely of the substituted acrylate monomer units through a carbonyl group or ketone linkage.

The substituted acrylate polymer must contain at least 1 carbon atom at the $R_2$ position since otherwise the polybutadienyl anions would attack the active hydrogen of the $R_2$ position and result in a terminated chain polymer.

It has been found that the reaction of the low or high vinyl polybutadienes onto the backbone of the substituted polyacrylates through the ketone group is not quantitative due presumably to the existence of impurities in the polymerization process. Generally, anywhere from 30 to about 50 percent of the polybutadiene will exist as a homopolymer. However, this facet is of no consequence in producing free flowing or tack free molding resins having high impact resistance. Amounts of unincorporated polybutadiene in excess of 60 percent still give improved properties although as should be apparent to one skilled in the art, as the amount of unincorporated polybutadiene increases, the improved properties will diminish. Generally, unless the non-grafted polybutadienes exist in very large amounts, that is approximately 85 to 90 + percent, they will not affect the graft copolymer properties since upon cure of the copolymer with conventional curing agents such as peroxides and the like, said non-grafted polybutadienes will be incorporated to the graft copolymer.

The weight percent of the substituted polyacrylates to the low or high vinyl polybutadienes is important in producing free flowing, tack free and high impact resistance graft copolymer compositions. Generally, a weight percent of the substituted polyacrylate or backbone polymer below approximately 25 percent is undesirable since the composition including ungrafted polybutadiene will fuse or coldflow. That is, according to the general accepted definition of coldflow, if a ten pound block of a rubber material is placed upon a ten pound block of an identical material and after a period of 24 hours at ambient temperatures the two blocks adhere to one another, that is they have flowed into each other, coldflow exists. Amounts of the backbone polymer in excess of approximately 75 percent have also been found to be undesirable. A suitable range exists from about 30 to about 65 percent with 40 to about 55 percent being preferred. Of course these figures are very rough since as previously noted, the coldflow properties can be effected by various items such as the molecular weight of the substituted polyacrylates and of the polybutadienes.

The graft copolymers of the present invention give rapid cures very similar to butadiene polymers containing high vinyl content. In addition to being free flowing, the impact resistance is generally greatly increased. For example, the gardner impact of high vinyl polybutadiene will usually range from about 0.2 to 0.5 inch-pounds whereas an average value of from 2.1 to about 3.5 inch-pounds is obtained by the graft copolymers having a high vinyl (50 percent +) content. The high vinyl graft copolymer resins produced according to the present invention are otherwise generally very similar to high vinyl polybutadiene and therefore have high heat stability and resistance. The high vinyl graft copolymers can therefore generally be used for molding articles wherever high heat distortion is desired and due to their free flowing powdery characteristics, can very readily be used in sheet molding, bulk molding, injection molding, for potting compounds, milling as well as for moisture proof films such as for transformer housings, food container linings and additionally as electrical insulators. The low vinyl graft copolymers produced according to the present invention tend to be more elastic when cured than the high vinyl graft copolymers, are very clear or transparent and therefore find preferred use as surgical tubes, blood plasma storage bags and the like.

Additionally, ingredients such as fillers, reinforcing agents such as glass fiber, glass fabric, compounding ingredients, flame retardants, pigments and the like can be utilized. Fillers such as carbon, glass fabric and silica are desirable since they generally reduce the cost of the graft copolymer and generally increase the flexural, and compression modulus and additionally tend to make the composition more powdery. Other suitable fillers include magnesia, alumina, clays and the like.

The present invention will be better understood by reference to the following examples and tables.

EXAMPLE I

Twenty grams of butadiene was added to a vessel along with 1.85 cc (1.62) moles of n-butyllithium. The butadiene was allowed to polymerize for 3 hours in tetrahydrofuran at about −20° to −25° C. A polymerized solution of high vinyl polybutadienyl lithium was then added to a solution containing 20 grams of polymethyl methacrylate dissolved in 400 cc of toluene. Two millimoles of n-butyl lithium was added to the polymethyl methacrylate solution prior to the addition of the polybutadienyl lithium solution. The specific technique utilized in adding the polybutadienyl lithium solution was via a double needle wherein the polymethyl methacrylate solution was highly stirred. Grafting occurred readily and rapidly at ambient temperature and was allowed to proceed for a few minutes after complete addition of the polybutadienyl lithium solution and the graft copolymer recovered by precipitation with methanol. The amount of ungrafted polybutadiene was 50 percent by weight.

A copolymer so prepared was tack free and gave mechanical properties when cured as set forth in Table I.

TABLE I

| | MECHANICAL PROPERTIES OF CURED PBD/MMA GRAFT COPOLYMERS | | | | | |
|---|---|---|---|---|---|---|
| | | | IMPACT RESISTANCE | | | |
| MOLTING METHOD | FLEXURAL STRENGTH | PROPERTIES (psi) MODULUS | IZOD (ft. lb.) | GARDNER (in. lb.) | HARDNESS (ROCK E-) | HEAT DIST. at 264 psi (° C) |
| Compression | 11,000 | 1,600,000 | .26 | 2.2 | 90 | 230 |

TABLE I-continued
MECHANICAL PROPERTIES OF CURED PBD/MMA GRAFT COPOLYMERS

| MOLTING METHOD | FLEXURAL STRENGTH | PROPERTIES (psi) MODULUS | IMPACT RESISTANCE IZOD (ft. lb.) | IMPACT RESISTANCE GARDNER (in. lb.) | HARDNESS (ROCK E-) | HEAT DIST. at 264 psi (° C) |
|---|---|---|---|---|---|---|
| Transfer | 11,600 | 1,800,000 | .23 | 2.0 | 87 | 230 |

Additional graft copolymers containing various weight percentages of methyl methacrylate were prepared in a manner similar to Example I and contained a substantial amount of homopolybutadiene (60 percent of the total butadiene content) while all of the methyl methacrylate was present as grafted copolymer.

TABLE II
PHYSICAL PROPERTIES OF CURED PBD/MMA GRAFT COPOLYMERS

| SAMPLE LETTER | MMA CONTENT (wt %) | HARDNESS (ROCKWELL E) | GARDNER IMPACT (in-lbs) | FLEXURAL MODULUS (psi×$10^{-5}$) | FLEXURAL STRENGTH (psi×$10^{-3}$) |
|---|---|---|---|---|---|
| A | 24.5 | 84 | 0.5 | 2.99 | 7.0 |
| B | 32.0 | 80 | 2.1 | 3.31 | 7.5 |
| C | 39.0 | 83 | 2.4 | 3.47 | 5.4 |
| D | 44.0 | 70 | 3.4 | 3.35 | 7.1 |
| E | 50.0 | 75 | 2.6 | 3.55 | 5.7 |
| F | 55.0 | 79 | 2.8 | 3.30 | 5.3 |

All of the above copolymers contain 2 parts per hundred rubber of dicumyl peroxide and 1 part per hundred rubber of silane coupling agent.

It can thus be seen that the disclosed invention carries out the objects of the invention set forth above. While according to the patent statutes the best mode has been set forth, it will be apparent to those skilled in the art that many other modifications can be made without departing from the spirit of the invention herein disclosed and described, the scope of the invention being limited solely by the scope of the attached claims.

What is claimed is:

1. A process for producing a graft copolymer, in a vessel, comprising:
    adding substituted polyacrylates to the vessel,
    said substituted polyacrylates having the repeating unit

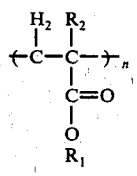

and produced by solely polymerizing monomers having the formula

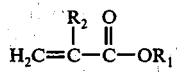

wherein $R_1$ is an alkyl hydrocarbon group having from 1 to 30 carbon atoms and wherein $R_2$ is an alkyl hydrocarbon group having from 1 through 12 carbon atoms, said polyacrylate having a number average molecular weight of from 10,000 to about 400,000,
    adding polymeric butadienyl anions to the vessel,
    anionically substituting said polymeric butadienyl anions for said —$OR_1$ groups of said substituted polyacrylate to form the graft copolymer so that said pendant substituted site has the structure

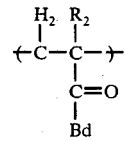

where Bd is said polymeric butadienyl anion, and carrying out said substitution until said graft copolymer contains from 25 to 75 percent by weight of said substituted polyacrylate, the number average molecular weight of said pendant polybutadiene ranging from 1,000 to about 200,000.

2. A process for producing a graft copolymer according to claim 1, wherein said polybutadienyl anion is produced by polymerizing butadiene monomers with an anionic catalyst.

3. A process for producing a graft copolymer according to claim 2, wherein said anionic catalyst is an organo alkali metal compound, said organo constituent being a hydrocarbon group selected from the group consisting of aliphatic, cycloaliphatic and aromatic compounds containing from 1 to 30 carbon atoms.

4. A process for producing a graft copolymer according to claim 2, wherein said anionic catalyst is n-butyl lithium.

5. A process for producing a graft copolymer according to claim 1, wherein at least 50 percent of the butadiene repeating units of said polymeric butadienyl anions are in the 1,2-configuration.

6. A process for producing a graft copolymer according to claim 2, wherein at least 80 percent of the butadiene repeating units of said polymeric butadienyl anions are in the 1,2-configuration.

7. A process for producing a graft copolymer according to claim 5, wherein said $R_1$ hydrocarbon contains from 1 through 4 carbon atoms and said $R_2$ hydrocarbon contains from 1 through 3 carbon atoms.

8. A process for producing a graft copolymer according to claim 5, wherein said substituted polyacrylate is polymethyl methacrylate.

9. A process for producing a graft copolymer according to claim 7, wherein the weight percent of said substituted polyacrylate based on the graft copolymer is from about 30 to about 65 percent.

10. A process for producing a graft copolymer according to claim 9, wherein said weight percent ranges from about 35 to about 55 percent.

11. A process for producing a graft copolymer according to claim 10, wherein said polybutadiene molecular weight ranges from about 12,500 to about 55,000 and said molecular weight range of said substituted polyacrylate is from about 20,000 to about 100,000.

12. A process for producing a graft copolymer according to claim 11, wherein the molecular weight of said polybutadiene ranges from about 30,000 to about 75,000.

13. A process for producing a graft copolymer according to claim 11, wherein the molecular weight of said polybutadiene is about 50,000.

14. A process for producing a graft copolymer according to claim 12, wherein the weight percent of said substituted polyacrylate based on said graft copolymer ranges from about 40 to about 55 percent.

* * * * *